(12) United States Patent
Grayson et al.

(10) Patent No.: US 9,395,048 B1
(45) Date of Patent: Jul. 19, 2016

(54) THERMALLY PROTECTED LIQUID ACQUISITION DEVICE FOR CRYOGENIC FLUIDS

(75) Inventors: Gary D. Grayson, Huntington Beach, CA (US); Edwin C. Cady, Tustin, CA (US)

(73) Assignee: The Boeing Company, Chicago, IL (US)

(*) Notice: Subject to any disclaimer, the term of this patent is extended or adjusted under 35 U.S.C. 154(b) by 1037 days.

(21) Appl. No.: 12/835,679

(22) Filed: Jul. 13, 2010

(51) Int. Cl.
*F17C 13/08* (2006.01)
*F17C 13/00* (2006.01)
*F02K 9/42* (2006.01)
*B64G 1/40* (2006.01)

(52) U.S. Cl.
CPC ............... *F17C 13/008* (2013.01); *B64G 1/401* (2013.01); *B64G 1/402* (2013.01); *F02K 9/425* (2013.01); *F17C 2225/044* (2013.01); *F17C 2227/0135* (2013.01); *F17C 2227/036* (2013.01); *F17C 2227/0372* (2013.01); *F17C 2227/0374* (2013.01); *F17C 2260/027* (2013.01); *F17C 2270/0186* (2013.01); *F17C 2270/0194* (2013.01)

(58) Field of Classification Search
CPC ............. F17C 13/008; F17C 2225/044; F17C 2227/0372; F17C 2227/0374; F17C 2227/036; F17C 2227/0135; F17C 2260/027; F17C 2270/0186; F17C 2270/0194; B64G 1/401; F02K 9/42; F02K 9/425; F02K 9/44; F02K 9/46
USPC .................. 62/48.2, 52.1, 46.3, 53.2
See application file for complete search history.

(56) References Cited

U.S. PATENT DOCUMENTS

| 3,302,416 | A | * | 2/1967 | Proctor et al. | 62/48.2 |
|---|---|---|---|---|---|
| 3,486,302 | A | * | 12/1969 | Paynter | 96/174 |
| 4,399,831 | A |   | 8/1983 | Robert |  |
| 4,412,851 | A |   | 11/1983 | Laine |  |
| 4,595,398 | A | * | 6/1986 | Orton | B64G 1/402 96/187 |
| 4,715,399 | A | * | 12/1987 | Jaekle et al. | 137/209 |
| 4,768,541 | A | * | 9/1988 | Uney | B64G 1/402 137/154 |
| 5,129,599 | A | * | 7/1992 | Wollen | F02C 7/236 244/135 R |
| 5,263,329 | A |   | 11/1993 | Grove |  |
| 5,398,515 | A | * | 3/1995 | Lak | 62/47.1 |
| 5,548,961 | A | * | 8/1996 | Luger et al. | 62/47.1 |
| 5,901,557 | A | * | 5/1999 | Grayson | 62/45.1 |
| 6,840,275 | B2 |   | 1/2005 | Grayson |  |
| 8,065,883 | B2 | * | 11/2011 | Pozivil | 62/50.1 |

OTHER PUBLICATIONS

Southwest Research Institute, "Chapters 1-6: The Dynamic Behavior of Liquids in Moving Containers with Applications to Space Vehicle Technology," NASA SP-106 (N67-15884), edited by H. Norman Abramson, 1966.

(Continued)

*Primary Examiner* — John F Pettitt

(57) ABSTRACT

A fluid management system for a cryogenic tank may include a liquid acquisition device and a spray injection system. The cryogenic tank may include a tank wall and may contain bulk tank fluid. The liquid acquisition device may acquire and contain cryogenic fluid in substantially liquid phase. The liquid acquisition device may be mounted in spaced relation to the tank wall. The spray injection system may receive the liquid from the liquid acquisition device and may spray the liquid into the bulk tank fluid.

19 Claims, 12 Drawing Sheets

(56) References Cited

OTHER PUBLICATIONS

Southwest Research Institute, "Chapters 7-11: The Dynamic Behavior of Liquids in Moving Containers with Applications to Space Vehicle Technology," NASA SP-106 (N67-15884), edited by H. Norman Abramson, 1966.

Wikipedia, Joule-Thompson Expander, retrieved Sep. 6, 2015.

E. C. Cady and J. B. Blackmon, "Developments in Low-Gravity Cryogenic Propellant Acquisition and Thermal Control Systems," MDAC Paper WD 2461, presented at the AIAA/SAE 10th Propulsion Conference, San Diego CA, Oct. 1974.

J. F. Lebar and E. C. Cady, "The Advanced Cryogenic Evolved Stage (ACES)," AIAA Paper 2006-7454, Sep. 2006.

\* cited by examiner

THERMALLY PROTECTED LIQUID ACQUISITION DEVICE FOR CRYOGENIC FLUIDS

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to cryogenic storage systems and, more particularly, to a fluid management system for controlling pressure and temperature in a cryogenic tank.

BACKGROUND

Cryogenic fluids such as liquid hydrogen ($LH_2$) and liquid oxygen ($LO_2$) are well-suited for use as propellants for extended-duration space missions due to their relatively high energy content per unit mass. Cryogenic propellants are also desirable for missions wherein the spacecraft must achieve relatively large changes in velocity to enable the spacecraft to reach a given orbit or attain a desired trajectory. A cryogenically-fueled rocket engine additionally provides the capability for engine shut-down and restart as may be required multiple times over the course of a mission. Even further, certain cryogenically-fueled rocket engines may be throttled to provide different levels of thrust at different times during a mission.

Advantageously, cryogenic fluid tanks require a relatively low amount of internal pressurization to prevent vaporization of the liquid cryogenic fluid. However, the tank internal pressure must be controlled to maintain the tank within its structural limits. In the environment of space, the tank internal pressure generally increases as a result of heating of the tank exterior from radiation and from other heat sources. The heating of the tank continuously warms the cryogenic fluid resulting in boil-off wherein a portion of the liquid cryogen is vaporized into the gaseous phase. The constant boil-off and pressure buildup within the tank may be controlled by minimizing temperature increases in the cryogenic fluid and by venting the tank.

Ideally, in a cryogenic propulsion system, only the gaseous phase of the cryogenic propellant is vented from the tank in order to maximize the reduction of tank internal pressure and avoid expulsion of valuable liquid propellant. In a significant gravitational environment such as on Earth or in response to the acceleration of a firing rocket engine, the high-density liquid phase of the cryogenic fluid is pulled toward the aft end of the tank near the engine feed line. Under such conditions, the low-density gaseous phase is located above the liquid phase at a forward end of the tank and can be directly vented to the tank exterior.

However, in the low-gravity environment of space, the liquid and gaseous phases of the cryogenic propellant are free to move about the tank. Direct venting from the forward end of the tank may result in expulsion of liquid phase with the gaseous phase. Furthermore, when the vehicle is in coast mode, deceleration forces on the vehicle due to on-orbit drag may cause the liquid propellant to migrate toward the forward end of the tank preventing direct venting of the gaseous phase from the tank forward end.

As can be seen, there exists a need in the art for a system and method for reliably venting the gaseous phase of fluid contained within a cryogenic tank in a low-gravity environment to prevent over-pressurization of the tank. Furthermore, there exists a need in the art for a system and method for minimizing temperature increases of the cryogenic fluid in order to minimize increases in tank pressure. For missions of extended duration, such a system preferably minimizes boil-off of the cryogenic liquid to maximize the amount of available propellant.

BRIEF SUMMARY

The above-noted needs associated with control of temperature and pressure in cryogenic tanks are addressed by the system and method disclosed herein. In an embodiment, disclosed is a fluid management system for a cryogenic tank having a tank wall and containing bulk tank fluid. The fluid management system may comprise a liquid acquisition device for acquiring and containing cryogenic fluid in substantially liquid phase. The liquid acquisition device may be mounted in spaced relation to the tank wall. The fluid management system may include a spray injection system for receiving the liquid from the liquid acquisition device and spraying the liquid into the bulk tank fluid. The spraying of the liquid into the bulk tank fluid provides forced convection mixing of the spray with the bulk tank fluid resulting in thermal destratification and pressure reduction in the tank.

In a further embodiment, disclosed is a cryogenic tank having a tank wall and containing bulk tank fluid. The tank may comprise a liquid acquisition device for acquiring and containing fluid in substantially liquid phase. The liquid acquisition device may be mounted in spaced relation to the tank wall. The tank may include a primary heat exchanger for chilling the liquid received within the spray injection system. The tank may also include a secondary heat exchanger mounted to the liquid acquisition device for chilling the liquid contained within the liquid acquisition device. The primary and secondary heat exchanger fluid may be vented to the tank exterior to reduce tank pressure. A spray injection system may receive the chilled liquid from the liquid acquisition device and spray the liquid into the bulk tank fluid for thermal destratification.

Also disclosed is a method of controlling pressure within a cryogenic tank containing bulk tank fluid. The method may comprise the steps of mounting a liquid acquisition device in spaced relation to the tank wall and filling the liquid acquisition device at least partially with liquid from the bulk tank fluid. The method may further include the steps of providing a flow of liquid from the liquid acquisition device to a spray injection system. The liquid may be sprayed into the bulk tank fluid for thermal destratification thereof.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
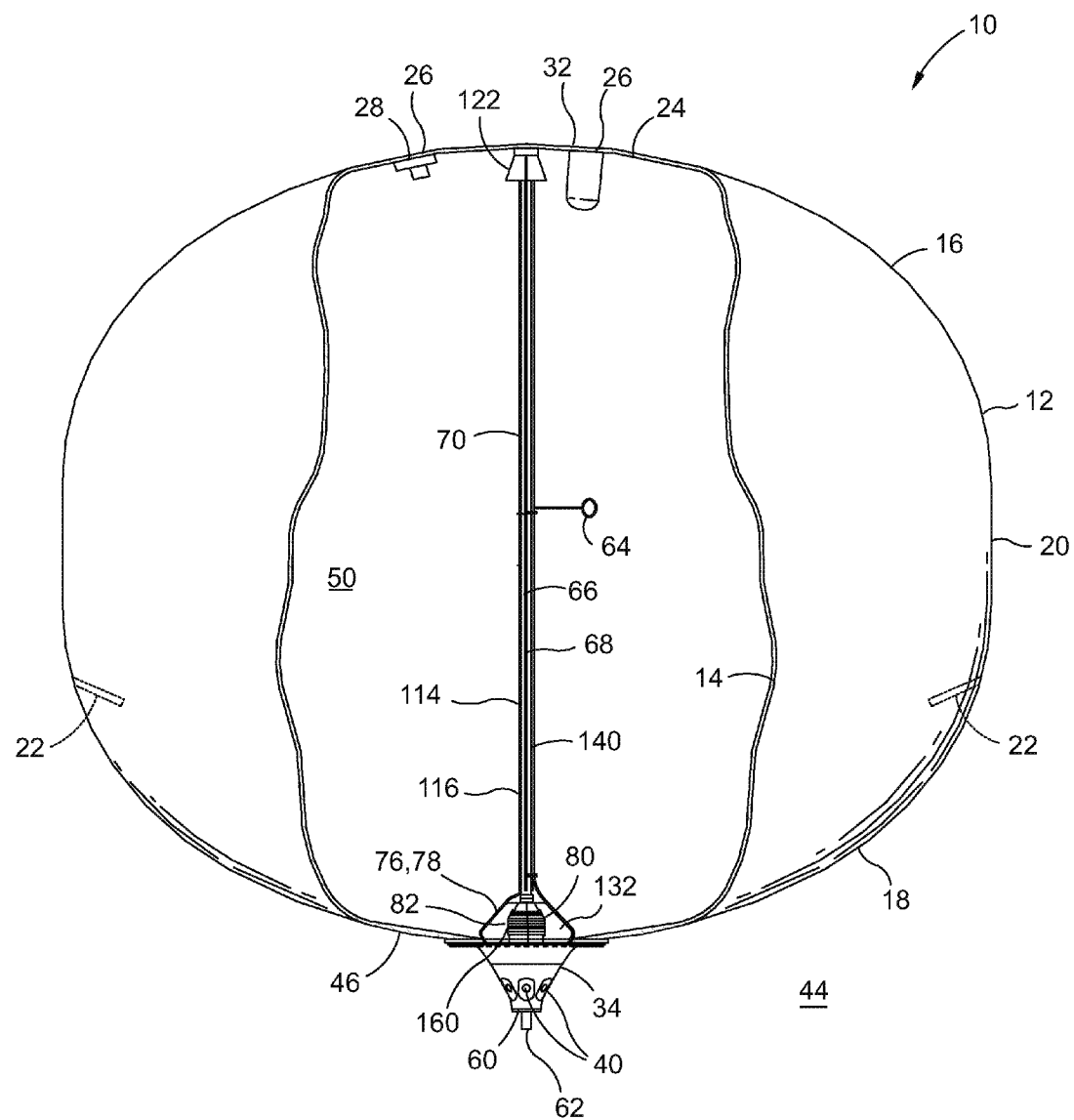
FIG. 1 is a partially cut away side view illustration of a cryogenic tank including a fluid management system comprising a liquid acquisition device and a thermodynamic vent system.

Referring now to the drawings wherein the showings are for purposes of illustrating preferred and various embodiments of the disclosure only, shown in FIG. 1 is a tank assembly 10 as may be used for storing cryogenic fluid 50 under pressure in a reduced gravity environment. Although shown as having a generally cylindrical shape with upper and lower domes 16, 18 interconnected by a cylindrical section 20, the tank 12 may be provided in any size, shape and configuration including, but not limited to, a spherical configuration.

The tank 12 illustrated in FIG. 1 may incorporate a fluid management system 76 as illustrated in FIGS. 2-9 which may comprise a liquid acquisition device 80, a thermodynamic vent system 78 and one or more heat exchangers 140, 160 for venting the tank 12. The liquid acquisition device 80 may include a mixer pump 100 (FIG. 2) and may provide a controlled flow of liquid 52 to the spray injection system 114 to facilitate mixing of bulk tank fluid 48 (FIG. 10). The thermodynamic vent system 78 and liquid acquisition device 80 may cooperate with one another to control the temperature of the bulk tank fluid 48 and the pressure within the tank 12 by mixing the bulk tank fluid 48 to minimize thermal stratification as illustrated in FIG. 10. The mixing of the bulk tank fluid 48 may occur by spraying or injecting chilled cryogenic liquid 50 from the liquid acquisition device 80 into the bulk tank fluid 48 as shown in FIG. 10.

Figure 4:
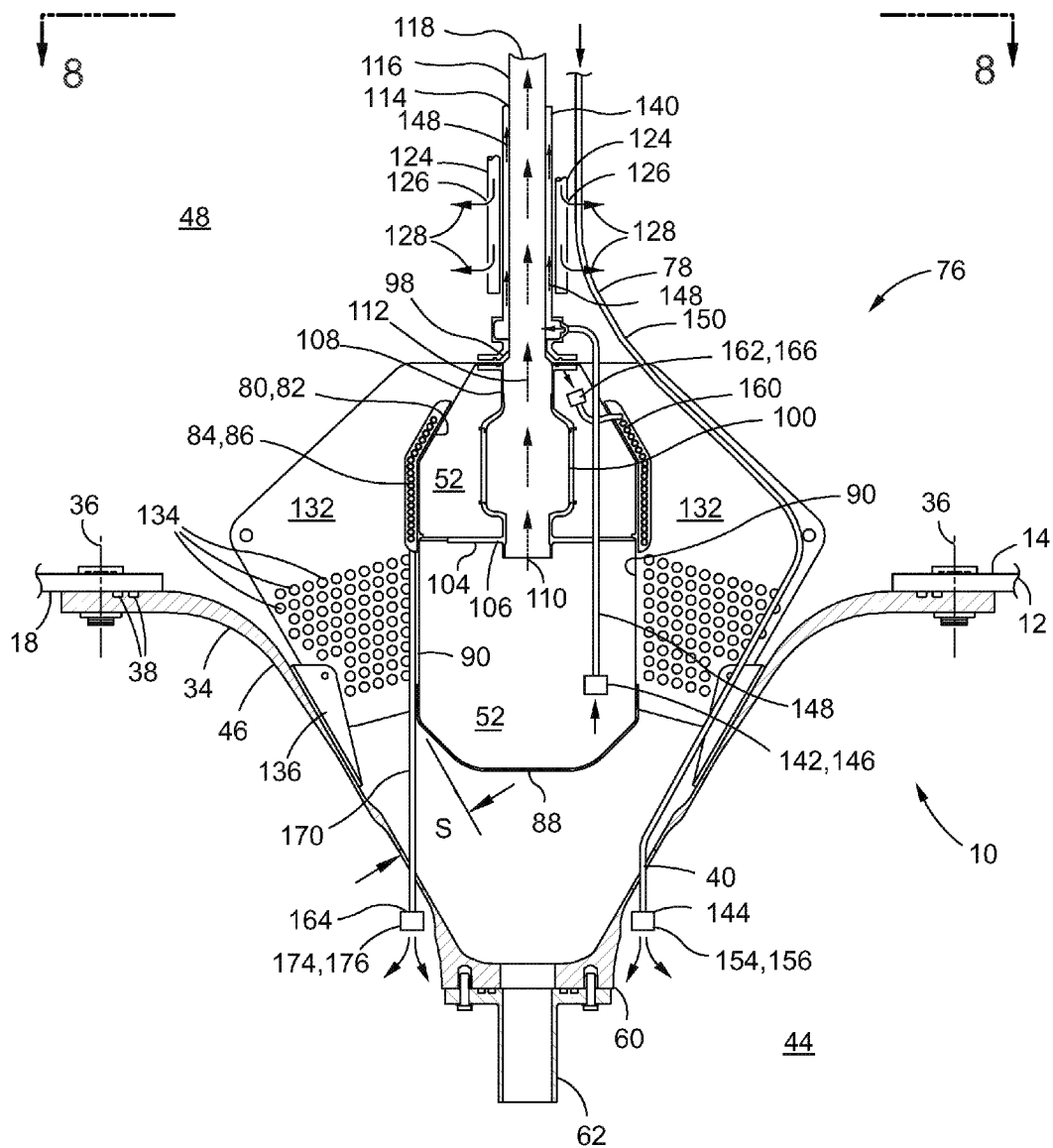
FIG. 4 is a cross-sectional illustration of the liquid acquisition device and a spray injection system coupled thereto and further illustrating a plurality of vanes supporting the liquid acquisition device on the sump.
Figure 5:
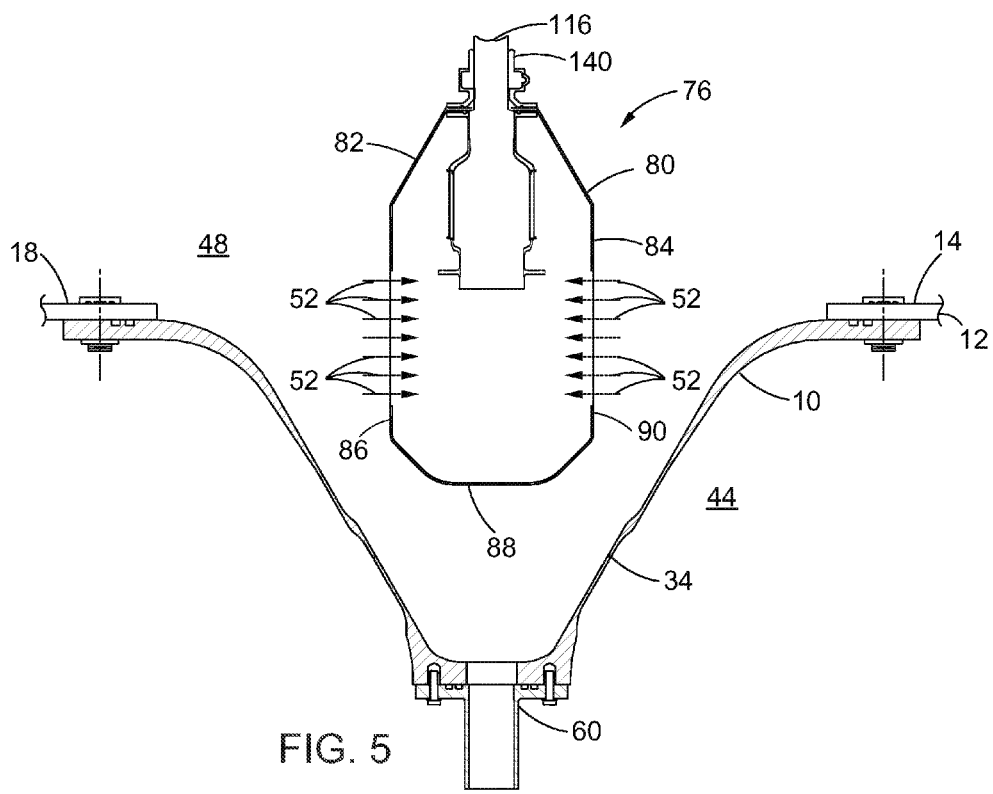
FIG. 5 is a simplified cross-sectional illustration of the liquid acquisition device illustrating the passage of liquid from bulk tank fluid into the liquid acquisition device.
Figure 9:
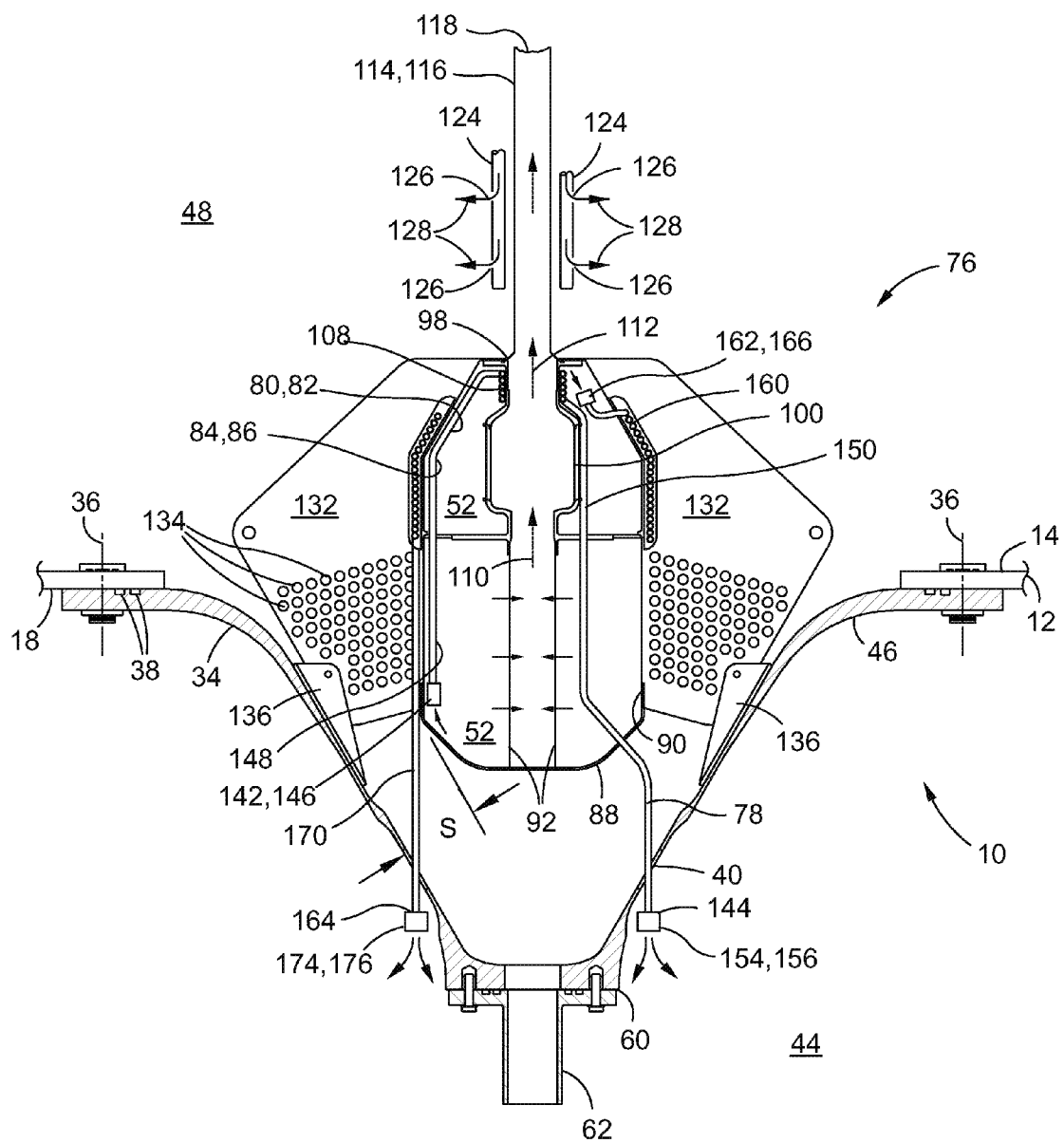
FIG. 9 is a cross-sectional illustration of the liquid acquisition device and illustrating an alternative embodiment of the primary heat exchanger in a coil tube arrangement around an outlet of the liquid acquisition device.
Figure 10:
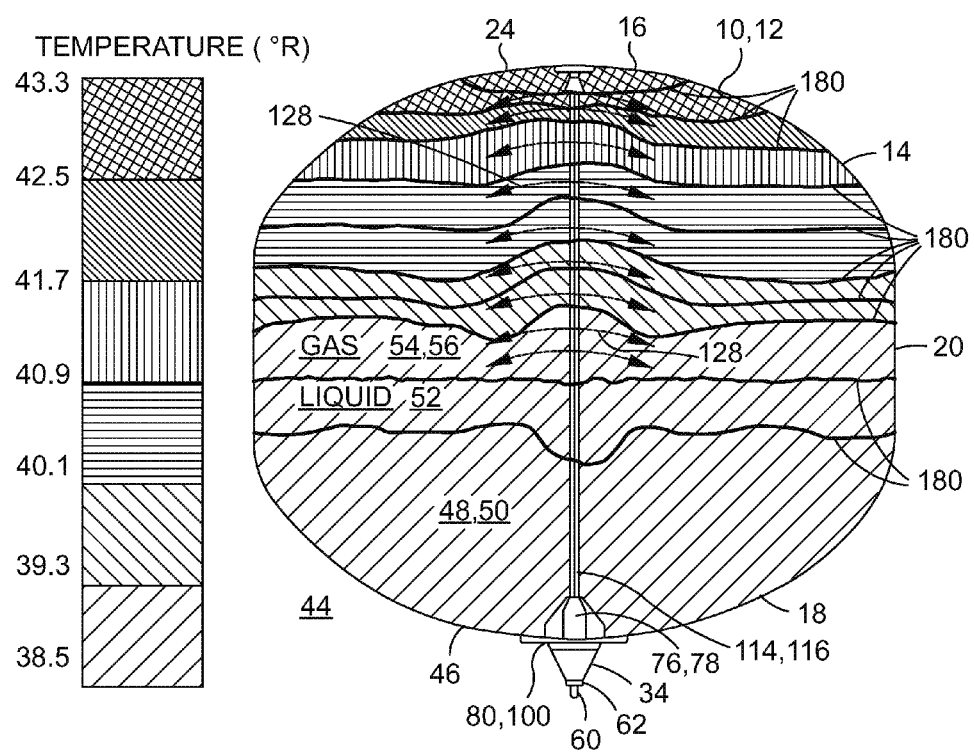
FIG. 10 is an illustration of a computer simulation of the thermodynamic performance of the spray injection system and liquid acquisition device and a plurality of isocontours illustrating thermal stratification of the liquid and gas phase of the bulk tank fluid.

Advantageously, the liquid acquisition device 80 may be mounted in spaced relation to the tank wall 14 as best seen in FIGS. 4-5 and 9 to limit heat conduction into the liquid acquisition device 80. In addition, the mounting of the liquid acquisition device 80 in spaced relation to the tank wall 14 may advantageously minimize heat entrapment in the liquid acquisition device 80. Such heat entrapment may result in unwanted boil-off (i.e., vaporization) of a portion of the liquid 52 contained within the liquid acquisition device 80 resulting in the formation of a bubble (not shown) of gaseous phase cryogenic fluid within the liquid acquisition device 80 which may compromise the functionality of the liquid acquisition device 80 in acquiring and containing the liquid 52.

Figure 6:
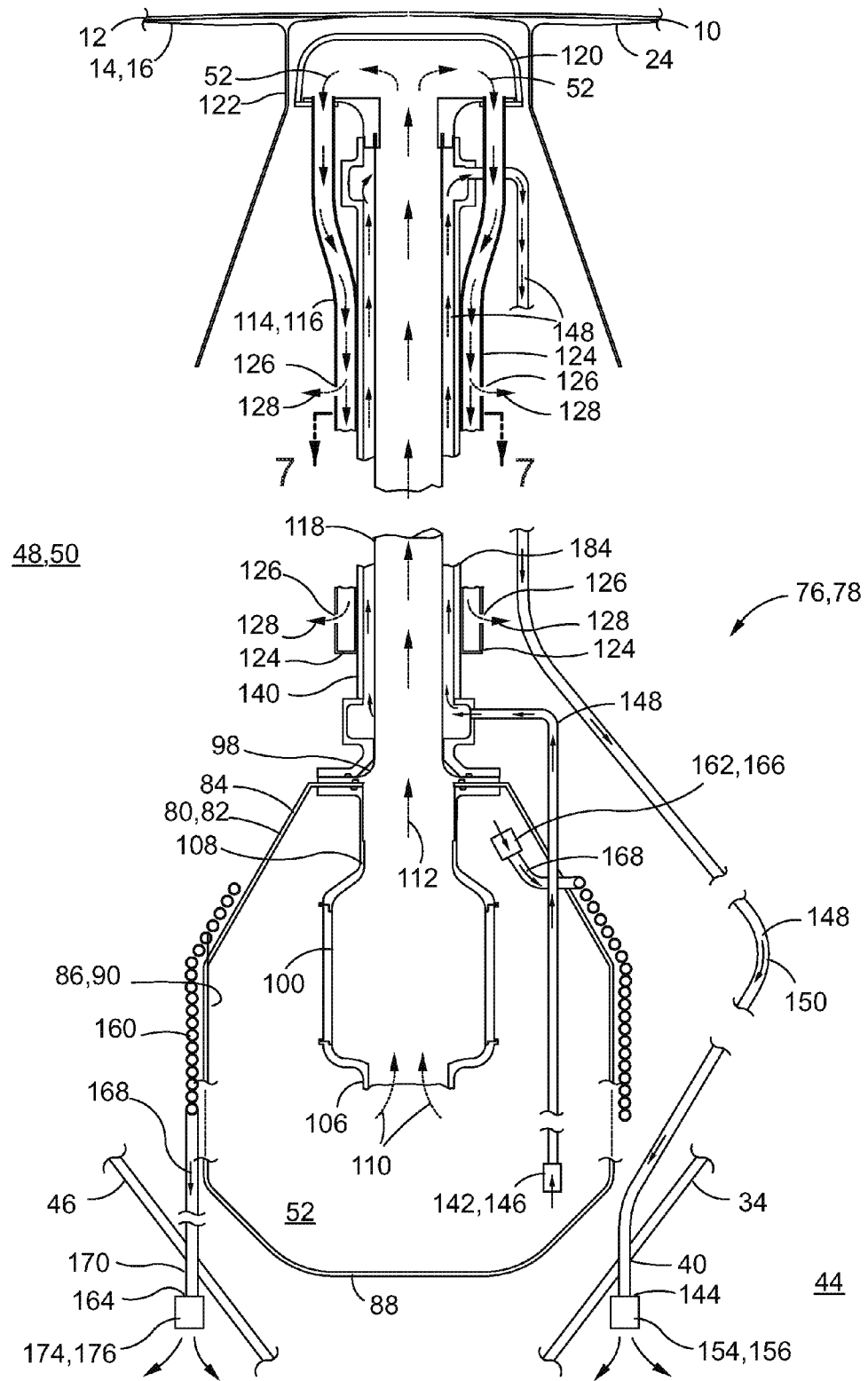
FIG. 6 is an enlarged sectional illustration of the liquid acquisition device and illustrating the flow of cryogenic liquid from the liquid acquisition device through the spray injection system and primary and secondary heat exchangers.

Referring briefly to FIG. 6, the fluid management system 76 may include one or more of the heat exchangers 140, 160 which may be activated to extract excess heat from the bulk tank fluid 48. The heat exchangers 140, 160 may be activated in combination with the mixing of the bulk tank fluid 48 or as an alternative to the mixing of the bulk tank fluid 48 as described in greater detail below. The heat exchangers 140, 160 may vent fluid to the tank exterior 44 to control the pressure within the tank 12. In this manner, the fluid management system 76 provides a means for managing the temperature and pressure of cryogenic fluid 50 contained within the tank 12. The cryogenic fluid 50 may comprise cryogenic propellant such as liquid oxygen ($LO_2$), liquid hydrogen (LH), liquid methane ($LCH_4$) or any other cryogenic fluid 50 or propellant which may be held in a sub-critical state for extended durations in a low-gravity environment. Such cryogenic propellant may be implemented as part of the propulsion system (not shown) of a launch vehicle, a satellite or any one of a variety of alternative applications.

Referring more particularly now to FIG. 1, shown is the tank assembly 10 including the tank 12 and incorporating the liquid acquisition device 80 and thermodynamic vent system 78. The tank assembly 10 may include a thermal protection system 46 (TPS) which may comprise multi-layer insulation (MLI) (not shown) or any one of a variety of other types of insulation for minimizing or reducing heat leak into the bulk tank fluid 48. For example, the TPS 46 may include foam insulation (not shown) that may be sprayed onto the tank exterior 44 or otherwise applied to the tank 12 at strategic locations such as the lower dome 18 and/or the tank 12 sump 34.

Referring still to FIG. 1, the tank 12 may include the upper dome 16 which may have an upper cover 24 through which upper dome penetrations 26 may be formed to facilitate the installation of plumbing, wiring, instrumentation and other systems. For example, the tank assembly 10 may include an upper dome penetration 26 for a pressurant 28 such as gaseous helium (GHe) or any other suitable pressurant 28 to facilitate pressurization of the tank 12 at the desired pressurization level. The tank assembly 10 may include an optical mass gauge 32 which may be mounted to the upper dome 16 for measuring or monitoring the mass or quantity of cryogenic fluid 50 in the tank 12 at any given time during the mission.

In this regard, the tank assembly 10 may include any one of a variety of alternative types of instrumentation to measure and/or monitor propellant mass and location within the tank 12. For example, the tank assembly 10 may include a radio frequency (RF) mass gauge 64 for measuring the volume of liquid 52 within the bulk tank fluid 48. As can be seen, the RF mass gauge 64 may be mounted on the spray injection system 114 which is illustrated in FIG. 1 as a spray bar assembly 116 extending axially between the liquid acquisition device 80 at the aft end of the tank 12 to the upper cover 24 at the forward end of the tank 12. The RF mass gauge 64 may include an RF cable 66 which may be routed downwardly along the spray injection system 114 by means of cable guides 68 and which may exit out of a sump penetration 40 formed in the sump 34.

Figure 2:
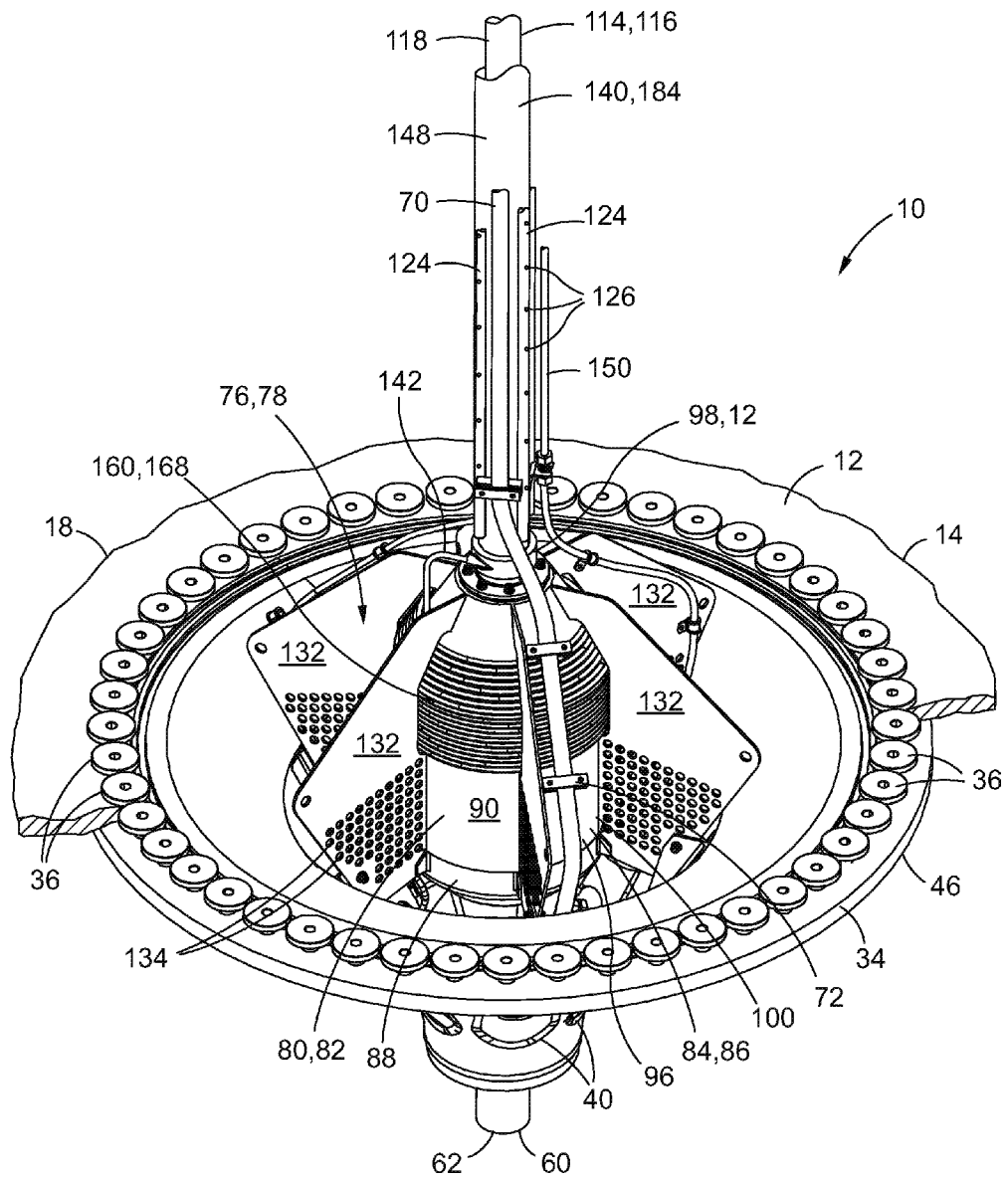
FIG. 2 is a perspective illustration of the liquid acquisition device and thermodynamic vent system mounted to a sump of the tank.
Figure 3:
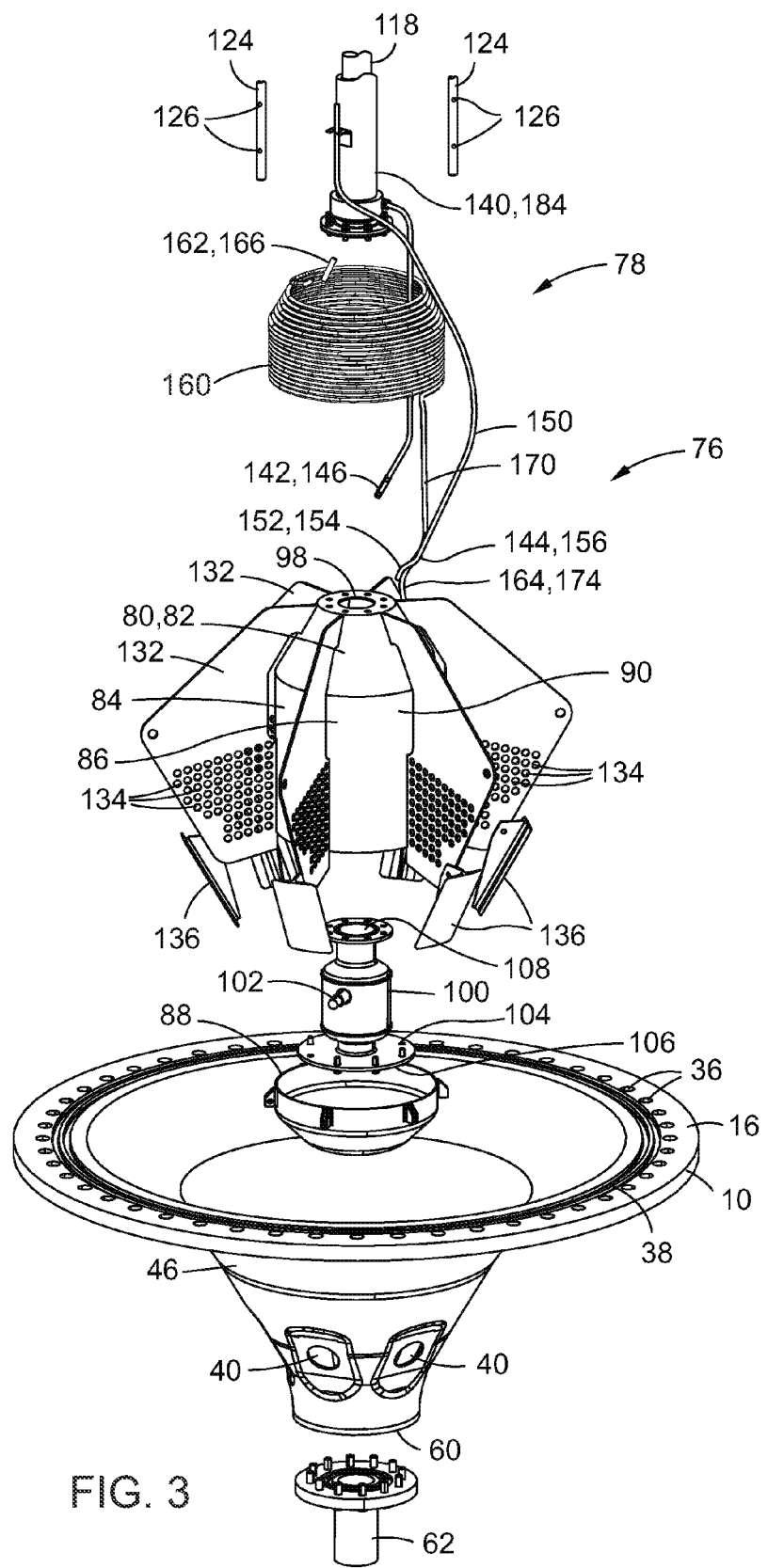
FIG. 3 is an exploded perspective illustration of the liquid acquisition device and thermodynamic vent system including primary and secondary heat exchangers of the thermodynamic vent system.

The tank assembly 10 may optionally include a level sensor 70 as shown in FIG. 2 and extending linearly along an axial length of the spray injection system 114 for sensing a level of the bulk tank fluid 48. In a non-limiting embodiment, the level sensor 70 may comprise the commercially available Cryo-Tracker® mass gauging system available from Sierra Lobo, Inc. of Fremont, Ohio. The level sensor 70 may extend axially along the spray injection system 114 and may be mounted to the vanes 132 via sensor clamps 72 as illustrated in FIG. 2 and may exit through one of the sump penetrations 40 formed in the sump 34 as illustrated in FIG. 3. As may be appreciated, a variety of alternative or additional types of instrumentation may be included within the tank assembly 10 for measuring and monitoring the mass, quantity, condition and location of cryogenic fluid 50 in the tank 12.

Referring to FIGS. 5-6, the fluid management system 76 as disclosed herein may acquire and retain liquid 52 within the liquid acquisition device 80. The liquid acquisition device 80 may facilitate a controlled flow of liquid 52 from the liquid acquisition device 80 to the spray injection system 114 as best seen in FIG. 6. As shown in FIG. 5, the liquid acquisition device 80 may include a liquid acquisition device housing 82 which may comprise a surface tension basket 84. The surface tension basket 84 may include mesh or screen material having a plurality of apertures. For example, the surface tension basket 84 may include outer screens 90 forming side walls 86 and/or a bottom wall 88 of the surface tension basket 84. The surface tension basket 84 employs surface tension effects to draw and retain liquid 52 within the liquid acquisition device 80. In this regard, the outer screens 90 of the surface tension basket 84 may include a plurality of apertures that are sized and configured to permit the passage of liquid 52 into the liquid acquisition device 80 and prevent the ingestion of gas 54 from the bulk tank fluid 48 into the liquid acquisition device 80.

For example, in an embodiment of the liquid acquisition device 80, the outer screens 90 may comprise 200×1400 or 325×2300 twilled Dutch double weave screen or any other suitable screen or mesh material having the appropriately-sized apertures to prevent passage of gas 54 into the liquid acquisition device 80. The liquid acquisition device housing 82 is shown as having a cylindrical lower portion and a conical upper portion. The conical shape may facilitate the flow of liquid 52 from out of the liquid acquisition device outlet 98 and into the spray injection system 114. Although shown as having a cylindrical-conical configuration, the liquid acquisition device housing 82 may be provided in any size, shape and configuration and is not limited to that which is illustrated in the Figures.

Figure 5A:
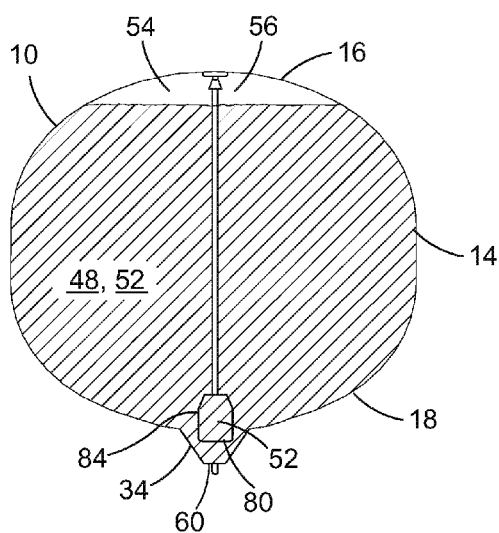
FIG. 5A is a schematic illustration of the tank and the liquid acquisition device surrounded by the liquid of the bulk tank fluid and further illustrating gas at least partially filling the tank ullage on an end of the tank opposite the liquid acquisition device.
Figure 5B:
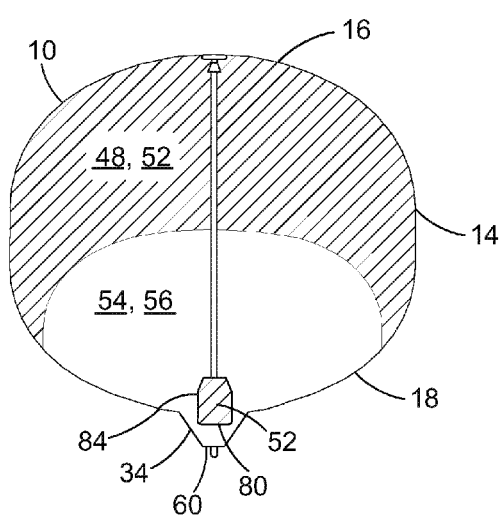
FIG. 5B is a schematic illustration of the tank and the liquid acquisition device retaining liquid and being surrounded by gas due to the migration of the bulk tank fluid away from the liquid acquisition device as a result of on-orbit drag.

Referring to FIGS. 5A-5B, liquid 52 is advantageously retained within the liquid acquisition device 80 regardless of the location of the bulk tank fluid 48 within the tank 12 such that a reliable supply of liquid 52 may be drawn from the liquid acquisition device 80 by the spray injection system 114 and sprayed into the bulk tank fluid 48 for thermally destratifying the bulk tank fluid 48. For example, FIG. 5A illustrates the tank having the liquid acquisition device 80 surrounded by the liquid 52 of the bulk tank fluid 48 as may occur prior to launch when the liquid 52 is pulled toward the tank outlet 60 such as under the effect of the Earth's gravitational force. The liquid 52 of the bulk tank fluid 48 may also be pulled toward the tank outlet 60 in response to the acceleration of a firing rocket engine (not shown) which may be located adjacent to the tank outlet 60. The gravitational force of the Earth or other planetary body and/or the acceleration from the thrust of a firing rocket engine (not shown) may cause the high-density liquid 52 phase of the bulk tank fluid 48 to surround and immerse the liquid acquisition device 80 such that the liquid acquisition device 80 may acquire and retain the liquid 52. As illustrated in FIG. 5A, the low-density gas 54 of the bulk tank fluid 48 may be located above the higher-density liquid 52 phase. The gas 54 may comprise vaporized bulk tank fluid 48 and/or pressurant (not shown) from a separate pressurant source such as from the gaseous helium (GHe) pressurant 28 source (FIG. 1) for pressurizing the tank 12 at the desired pressurization level.

Referring to FIG. 5B, shown is a schematic illustration of the tank 12 and the liquid acquisition device 80 containing liquid 52 and being surrounded by gas 54 due to the migration of the liquid 52 away from the tank outlet 60 such as a result of on-orbit drag. For example, the migration of the liquid 52 away from the tank outlet 60 may occur after the rocket engine is shut down upon reaching a desired orbit and the spacecraft is in coast mode. Deceleration forces from the on-orbit drag may cause the bulk tank fluid 48 to migrate away from the liquid acquisition device and flow toward an end of the tank 12 opposite the liquid acquisition device 80 such that the liquid acquisition device 80 is surrounded by gas 54. Advantageously, the liquid acquisition device 80 retains liquid 52 therewithin due to surface tension effects as described above such that a dedicated supply of liquid 52 is available to the spray injection system 114. The liquid acquisition device 80 may be refilled upon settling of the bulk tank fluid 48 toward the tank outlet 60 as shown in FIG. 5A such as by activating reaction control system (RCS) thrusters (not shown). Likewise, the liquid 52 of the bulk tank fluid 48 may be maintained in proximity to the tank outlet 60 under the influence of acceleration forces from a firing rocket engine (not shown) such that the liquid acquisition device 80 may be surrounded by or immersed in the liquid 52 and allowing for refilling of the liquid acquisition device 80.

As can be seen in FIGS. 4-6, the liquid acquisition device 80 may advantageously be mounted in spaced relation to the inner tank wall 14 or sump 34 at a predetermined spacing s. The spacing s between the liquid acquisition device 80 and the tank wall 14 or sump 34 may minimize heat entrapment that may otherwise occur with direct contact between the liquid acquisition device 80 and the inner tank wall 14 or sump 34. Furthermore, the spacing s between the liquid acquisition device 80 and the tank wall 14 or sump 34 provides an unobstructed flow path for the bulk tank fluid 48 liquid 52 into the tank outlet 60 upon settling of the bulk tank fluid 48. In this regard, the liquid 52 contained within the liquid acquisition device 80 is thermally isolated from the tank wall 14 or sump 34 to minimize heat conduction into the liquid 52 contained within the liquid acquisition device 80.

Referring to FIG. 4, the fluid management system 76 may include a plurality of vanes 132 which may be mounted on the tank wall 14 proximate to the tank outlet 60 such as on the sump 34. The vanes 132 may provide multiple functionality including retaining the liquid 52 phase of the bulk tank fluid 48 in proximity to the tank outlet 60 by providing additional wetting area to draw and retain the liquid 52 due to surface tension effects. In this regard, the vanes 132 may retain the bulk tank fluid 48 liquid 52 proximate to the tank outlet 60 in a low-gravity environment for liquid 52 acquisition to the main engine during an engine start. Furthermore, the vanes 132 may retain liquid 52 adjacent to the liquid acquisition device 80 for refilling of the liquid acquisition device 80 during operation of the mixer pump 100 (FIG. 3) of the spray injection system 114.

The vanes 132 may further provide anti-vortex functionality wherein the vanes 132 reduce or minimize the natural tendency for vortex formation in the bulk tank fluid 48 as the fluid exits the tank 12 at the tank outlet 60. In addition, the vanes 132 may reduce momentum of the bulk tank fluid 48 at the tank outlet 60. In this regard, the tank 12 may optionally include one or more internal slosh baffles 22 (FIG. 1) or alternative slosh-reducing mechanisms to minimize momentum of the bulk tank fluid 48 as may occur during RCS firing or during landing maneuvers or other operations. The vanes 132 may also provide functionality as additional heating exchanger area to facilitate chilling of the liquid 52 within the liquid acquisition device 80 in a manner as will be described in greater detail below.

Referring to FIGS. 2-6, the fluid management system 76 may comprise the liquid acquisition device 80, the spray injection system 114 and primary and secondary heat exchangers 140, 160. The liquid acquisition device 80, spray injection system 114 and primary and secondary heat exchangers 140, 160 may be mounted to the sump 34 which, in turn, may be mounted to the tank 12 such as to the lower dome 18 by means of one or more sump attach fasteners 36. As mentioned above, the liquid acquisition device 80 may be supported by one or more of the vanes 132 which may be mounted to the sump 34 by means of one or more vane mounting brackets 136 (FIG. 3) or other suitable hardware. Advantageously, the mounting of the fluid management system 76 components to the sump 34 may facilitate assembly and installation of the fluid management system 76 into the tank 12 wherein the liquid acquisition device 80, spray injection system 114 and heat exchangers 140, 160 may first be mounted to the sump 34 followed by insertion thereof into the tank 12 through the sump 34 opening in the lower dome 18.

As shown in FIG. 6, the forward end of the spray injection system 114 may be received within a suitable retention mechanism such as a sleeve 122. The sleeve 122 may be mounted to or integrally formed with the upper dome 16 or upper cover 24. The sleeve 122 may allow for axial movement of the spray bar assembly 116 relative to the upper dome 16 of the tank 12 as may occur due to static and dynamic flight loads. As shown in FIG. 4, the sump 34 may be mounted to the tank 12 at the lower dome 18 and may include one or more sump seals 38 which may be formed as a redundant pair of grooves for accepting a pair of O-ring seals (not shown). It should be noted that the above-described configuration for mounting the fluid management system 76 is a non-limiting embodiment. In this regard, the present disclosure contemplates a variety of alternative arrangements for mounting and installing the fluid management system 76.

Referring to FIGS. 3-4, the liquid acquisition device 80 may include a mixer pump 100 which may be integrated with or mounted to the liquid acquisition device housing 82. In an embodiment, the mixer pump 100 may be electrically powered and may include a pump electrical line 102 (FIG. 3) extending outwardly through the liquid acquisition device 80 and exiting one of the sump penetrations 40 formed in the sump 34. However, the mixer pump 100 may be powered by any suitable means and is not limited to an electrically powered configuration. For example, the mixer pump 100 may be pneumatically driven or hydraulically driven. Alternatively, the mixer pump 100 may be configured as a gas turbine driven pump. Even further, the mixer pump 100 may be configured as a positive displacement pump as opposed to a rotary pump.

Additionally, the mixer pump 100 is not limited to mounting within the liquid acquisition device 80. For example, the mixer pump 100 may be mounted within the tank 12 on an exterior of the liquid acquisition device 80. Even further, it is contemplated that the mixer pump 100 may be positioned on an exterior side of the tank 12. However, a preferred arrangement of the mixer pump 100 is mounting within the liquid acquisition device 80 as shown in FIG. 4.

As can be seen in FIGS. 3-4, the mixer pump 100 may be supported by a pump mounting bracket 104 which may extend radially between the liquid acquisition device housing 82 and a pump inlet 106 of the mixer pump 100. The mixer pump 100 may include a pump outlet 108 which may include a flange for mounting to the liquid acquisition device outlet 98 (FIG. 4). The liquid acquisition device outlet 98 may be mounted to the spray injection system 114. In the embodiment shown in FIGS. 3-4 and 6-7, the spray injection system 114 may comprise a spray bar assembly 116. Alternative embodiments of the spray injection system 114 may include, but are not limited to, an axial spray device (not shown) mounted to the liquid acquisition device outlet 98 and/or spray rings (not shown) mounted to the liquid acquisition device 80 for spraying liquid 52 into the bulk tank fluid 48 for reducing thermal stratification of the bulk tank fluid 48.

Figure 7:
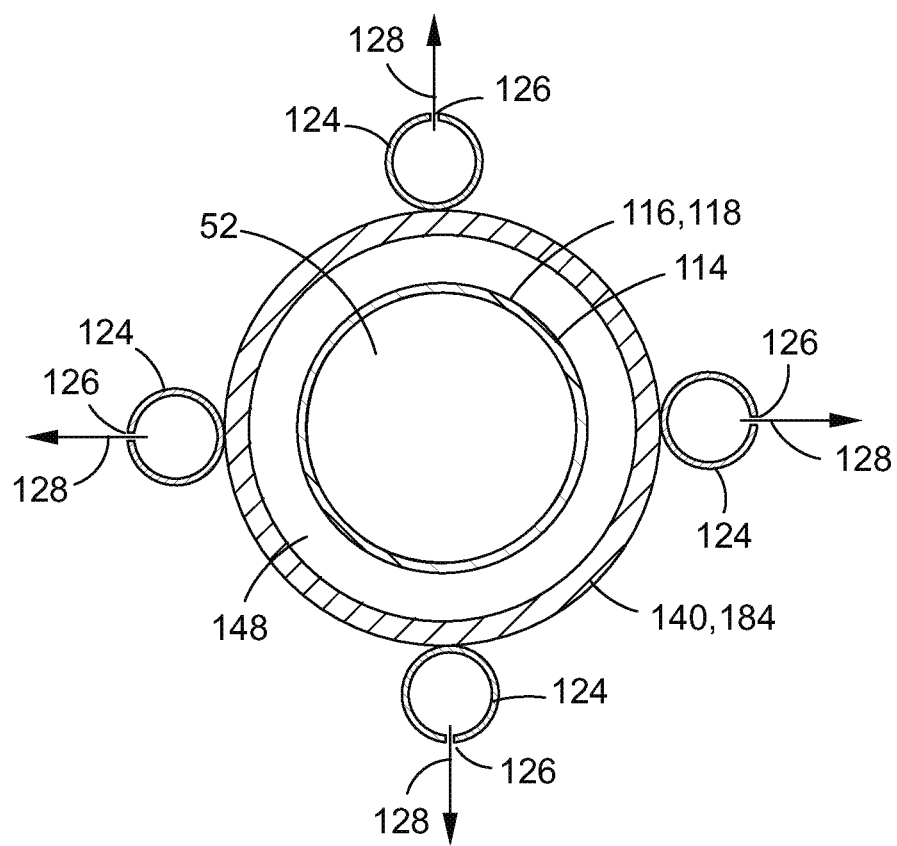
FIG. 7 is a sectional illustration of the spray injection system taken along line 7-7 of FIG. 6 and illustrating a plurality of spray tubes surrounding a main spray bar conduit and further illustrating an embodiment of the primary heat exchanger comprising a concentric tube arrangement around the main spray bar conduit.

Referring to FIGS. 6-7, shown is the spray bar assembly 116 for receiving liquid 52 from the liquid acquisition device 80 and spraying the liquid 52 into the bulk tank fluid 48 for mixing the bulk tank fluid 48 and reducing thermal stratification thereof. Referring briefly to FIG. 10, shown is an illustration of a computer simulation of the bulk tank fluid 48 in a one-g environment wherein the liquid 52 and gas 54 phases of the bulk tank fluid 48 receive an injection of spray from the spray tubes 124 surrounding a main spray bar conduit 118. The injection of liquid spray jets 128 into the bulk tank fluid 48 provides forced convection mixing of the spray with the ullage 56 gas 54 of the bulk tank fluid 48 causing heat transfer into the liquid 52 portion of the bulk tank fluid 48.

In this manner, the spray of liquid 52 reduces thermal stratification in the bulk tank fluid 48 illustrated in FIG. 10 as isocontours 180 in a one-g environment. As may be appreciated, the location of the liquid 52 and gas 54 phases of the bulk tank fluid 48 may be more widely dispersed in a micro-gravity environment. However, in a micro-gravity environment, the spray of liquid 52 from the spray bar assembly 116 (FIG. 4) is effectively mixed with the bulk tank fluid 48 to reduce thermal stratification and eliminate localized hot spots within the ullage 56.

Referring still to FIGS. 6-7, in an embodiment, the spray bar assembly 116 may include a main spray bar conduit 118 extending upwardly from the pump outlet 108 and/or liquid acquisition device outlet 98. The spray bar assembly 116 may be in fluid communication with the liquid acquisition device 80 (FIG. 6) to receive liquid 52 pumped by the mixer pump

100 when activated. The mixer pump 100 may be communicatively coupled to a controller (not shown) which may receive temperature, pressure, fluid mass and fluid location data from instrumentation such as the optical mass gauge 32 illustrated in FIG. 1. The mixer pump 100 may be activated in response to a command signal from the controller to pump liquid 52 into the spray injection system 114 to maintain the tank 12 within the desired operating parameters such as within predetermined temperature and pressure bands. The liquid 52 may flow from the pump outlet 108 and through the main spray bar conduit 118 for distribution to one or more of the spray tubes 124. Each one of the spray tubes 124 may include a plurality of orifices 126 for discharging spray jets 128 in a generally radially outward direction.

Referring briefly to FIGS. 2-4, the fluid management system 76 may include the plurality of the vanes 132 which may support the liquid acquisition device 80. Each one of the vanes 132 may be attached to the sump 34 by a vane mounting bracket 136 (FIG. 3) or other suitable attachment means. The vanes 132 may be generally vertically oriented although the vanes 132 may be arranged in any orientation. The vanes 132 may be configured as generally thin sheet members although the vanes 132 may be provided in any one of a variety of shapes, sizes and configurations. The vanes 132 may be perforated with a plurality of holes 134 to allow liquid 52 to flow through the vanes 132. The holes 134 in the vanes 132 may reduce the momentum of the liquid 52 as a result of fluid friction losses as the liquid 52 flows through the holes 134.

The vanes 132 may be connected to the liquid acquisition device housing 82 at the inner edges of the vanes 132. The vanes 132 may include a cutout along the inner edge of the vanes 132 to accommodate a secondary heat exchanger 160 (FIG. 2) which may be included with the fluid management system 76. The secondary heat exchanger 160 may be mounted on an exterior surface of the liquid acquisition device housing 82. The vanes 132 may provide additional heat exchanger area to the secondary heat exchanger 160 to improve cooling of the liquid 52 within the liquid acquisition device 80 as described in greater detail below.

Figure 8:
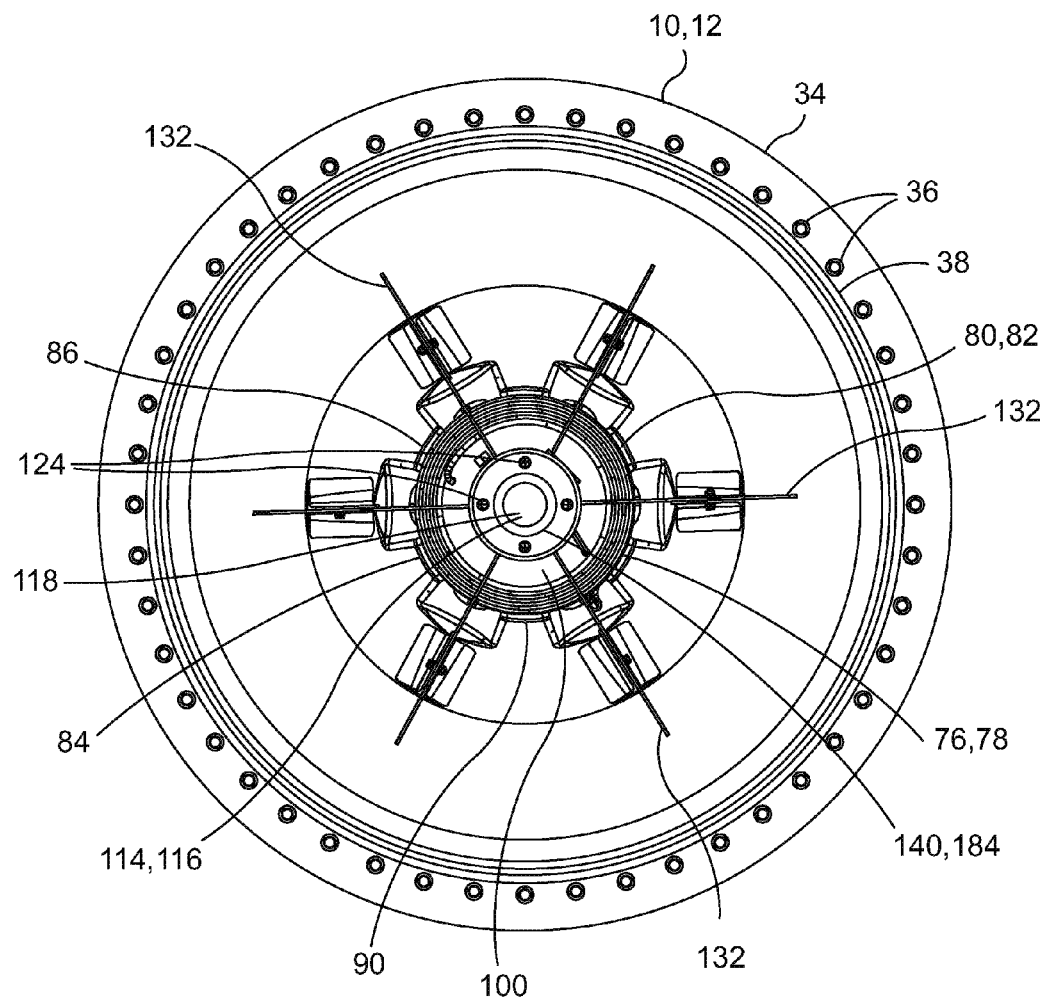
FIG. 8 is a top view of the liquid acquisition device taken along line 8-8 of FIG. 4 and illustrating the plurality of vanes mounted to the sump.

Referring briefly to FIG. 8, shown is a top view of the fluid management system 76 illustrating the liquid acquisition device housing 82 mounted to the sump 34 by means of the plurality of vanes 132. Although six of the vanes 132 are shown mounted in equiangularly-spaced relation to one another, any number of vanes 132 may be provided in any orientation and spacing. Furthermore, it is contemplated that the vanes 132 may be altogether omitted from the fluid management system 76. In this regard, the liquid acquisition device 80 may be mounted in spaced relation to the sump 34 by any suitable means and is not limited to mounting by means of the vanes 132 as illustrated in FIGS. 2-4.

Referring to FIG. 6, shown is the spray injection system 114 comprising the axially oriented main spray bar conduit 118 (FIG. 4) extending from the liquid acquisition device 80 to a manifold 120 at an upper end of the main spray bar conduit 118. The manifold 120 may distribute liquid 52 from the main spray bar conduit 118 into one or more of the spray tubes 124 arranged in a radial pattern around the main spray bar conduit 118. For example, FIG. 7 illustrates four of the spray tubes 124 arranged in equiangularly-spaced relation around the centrally-located main spray bar conduit 118. Each one of the spray tubes 124 may include a plurality of orifices 126 which may be spaced along the length of each one of the spray tubes 124. Although four of the spray tubes 124 are shown, any number may be provided. As illustrated in FIG. 6, the liquid 52 from the main spray bar conduit 118 (FIG. 7) is distributed into the spray tubes 124. The liquid 52 flows downwardly through each one of the spray tubes 124 and exits laterally as a spray jet 128 at each one of the orifices 126 to transfer heat from the ullage 56 gas 54 to the bulk tank fluid 48.

Referring still to FIG. 6, the fluid management system 76 may include a primary heat exchanger 140 which may comprise an active portion of the thermodynamic vent system 78. The primary heat exchanger 140 may be configured in a parallel-flow, concentric tube arrangement 184 extending along at least a portion of a length of the spray bar assembly 116. In the embodiment shown, the primary heat exchanger 140 may extend from the pump outlet 108 or liquid acquisition device outlet 98 upwardly toward the manifold 120 of the spray bar assembly 116. The primary heat exchanger 140 provides a means for chilling the liquid 52 that is pumped out of the liquid acquisition device 80 (i.e., the pump outflow 112) by the mixer pump 100. Due to heat output of the mixer pump 100, the pump outflow 112 may be heated to a slightly higher temperature than the majority of the liquid 52 contained within the liquid acquisition device 80.

Figure 11:
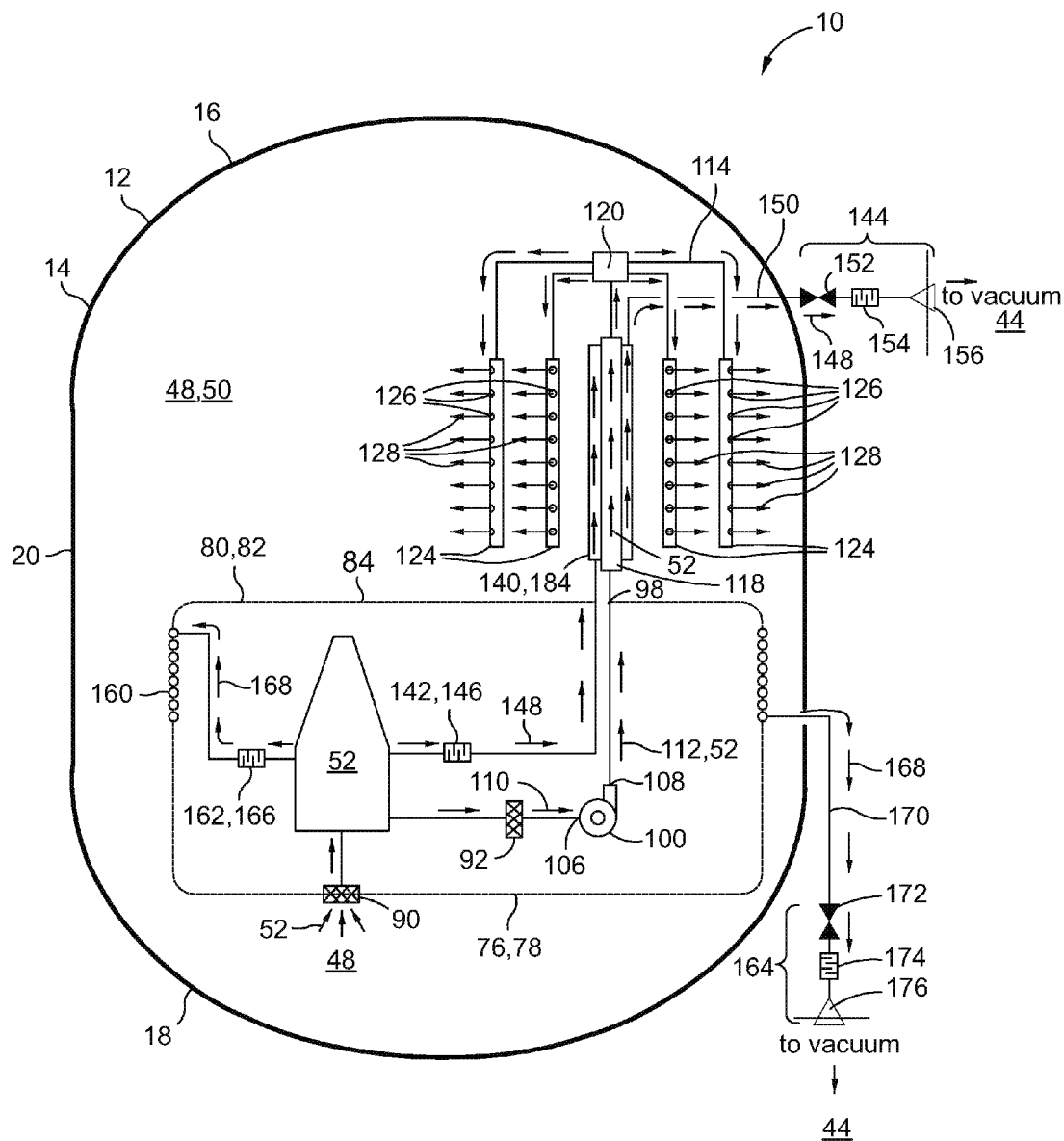
FIG. 11 is a schematic diagram of an embodiment of the fluid management system integrated into the cryogenic tank.

Referring to FIGS. 6 and 11, the primary heat exchanger 140 may withdraw relatively cooler liquid 52 from the liquid acquisition device 80 by means of a primary heat exchanger inlet 142 located toward an aft end of the liquid acquisition device 80. The primary heat exchanger inlet 142 may include a Joule-Thomson expander 146 for reducing the temperature and/or pressure of the liquid 52 flowing into the primary heat exchanger 140. The primary heat exchanger 140 may withdraw a portion of the liquid 52 from the liquid acquisition device 80 on a continuous or intermittent basis and pass the liquid 52 through the Joule-Thomson expander 146 to produce a primary heat exchanger fluid 148 which may comprise a two-phase fluid (i.e., a liquid 52 phase and a gas 54 phase) of reduced temperature and pressure.

As can be seen in FIGS. 6 and 11, the primary heat exchanger fluid 148 flows upwardly into the primary heat exchanger 140 extending along the spray bar assembly 116 and absorbing heat from the relatively warmer liquid 52 pumped out of the mixer pump 100. During passage through the primary heat exchanger 140, the primary heat exchanger fluid 148 may be substantially evaporated into a gas 54 phase and vented to the tank exterior 44 with preferably minimal loss of liquid 52 while maximizing heat rejection from the tank 12. As can be seen in FIG. 6, a primary vent line 150 may route the vaporized primary heat exchanger fluid 148 downwardly along the spray bar assembly 116 where the primary vent line 150 passes through a sump penetration 40 and terminates at a primary heat exchanger outlet 144 at the tank exterior 44.

In an embodiment shown in FIG. 11, the primary heat exchanger outlet 144 may include an additional Joule-Thomson expander 154 for further reduction of the temperature and pressure of the primary heat exchanger fluid 148 prior to venting to the tank exterior 44. A primary vent valve 152 may be included for regulating release of the primary heat exchanger fluid 148 through a primary vent device 156. In this manner, the primary heat exchanger 140 provides a means for chilling the liquid 52 that is pumped out of the mixer pump 100 (FIG. 6) prior to the spraying of the liquid 52 into the bulk tank fluid 48 by the spray injection system 114.

Referring briefly to FIG. 9, shown is an alternative embodiment of the primary heat exchanger 140 configured in a spiral tube arrangement 186. The liquid acquisition device 80 may include an inner screen 92 to contain a reliable supply of pump inflow 110 liquid 52 for the mixer pump 100 during activation of the spray injection system 114. The inner screen 92 may be configured in a cylindrical embodiment extending from the pump inlet 106 (FIG. 6). However, the inner screen 92 may be implemented in any one of a variety of alternative embodiments. The primary heat exchanger inlet 142 in FIG. 9 may be preferably located toward a lower end of the liquid acquisition device 80 at a maximum distance from the mixer pump 100 to draw in relatively cooler liquid 52. The primary heat exchanger 140 may be formed in a spiral tube arrangement 186 and may be mounted on the pump outlet 108 and/or liquid acquisition device outlet 98 for extracting heat from the relatively warmer pump outflow 112 prior to entering the spray injection system 114.

The spiral tube arrangement 186 of the primary heat exchanger 140 of FIG. 9 may be extended along any portion of the length of the main spray bar conduit 118 for extracting heat from the liquid 52 flowing within the main spray bar conduit 118. The primary heat exchanger 140 of FIG. 9 may include a Joule-Thomson expander 146 at the primary heat exchanger inlet 142 and a Joule-Thomson expander 154 at the primary heat exchanger outlet 144 similar to that which is illustrated in the parallel-flow, concentric tube arrangement 184 of the primary heat exchanger 140 of FIG. 6. The primary vent line 150 illustrated in FIG. 9 may extend downwardly through the liquid acquisition device 80 and may exit the tank 12 at the sump penetration 40 and may include a Joule-Thomson expander 154 for further reduction of the temperature and/or pressure of the primary heat exchanger fluid 148 prior to venting to the tank exterior 44 by means of a primary vent valve 152 similar to the arrangement illustrated in FIG. 11 and described above.

Referring to FIGS. 6 and 11, a secondary heat exchanger 160 may be included with the fluid management system 76 and may comprise a passive portion of the thermodynamic vent system 78. The secondary heat exchanger 160 may be provided in any one of a variety of configurations. For example, FIG. 6 illustrates the secondary heat exchanger 160 in a spirally-wound tubular coil arrangement mounted on the liquid acquisition device housing 82. The secondary heat exchanger 160 may facilitate chilling of the liquid 52 contained within the liquid acquisition device 80 to prevent the accumulation of thermal energy from environmental heat leaks such as from plumbing extending from the tank exterior 44 into the liquid acquisition device 80. Such plumbing may comprise vent lines, power lines such as the pump electrical line 102 (FIG. 3) for powering the mixer pump 100, and signal lines for instrumentation such as for monitoring and/or measuring fluid mass, location, temperature, pressure and any one of a variety of other parameters as indicated above.

Referring still to FIGS. 6 and 11, the secondary heat exchanger 160 may terminate at a secondary vent line 170 which may extend downwardly along a side of the liquid acquisition device housing 82 and may pass through a sump penetration 40. The secondary heat exchanger 160 may terminate at the secondary heat exchanger outlet 164 which may optionally include a Joule-Thomson expander 174 for reducing a temperature or pressure of the secondary heat exchanger fluid 168 prior to release to the environment. Release of the secondary heat exchanger fluid 168 may be effectuated by means of a secondary vent valve 172 (FIG. 11) of the secondary heat exchanger outlet 164.

The secondary heat exchanger fluid 168 is preferably vaporized during passage through the secondary heat exchanger 160 due to exchange of heat with the bulk tank fluid 48 such that the substantially gaseous phase is released with minimal release of liquid through the secondary vent device 176. The secondary heat exchanger 160 provides a means for chilling the liquid 52 contained within the liquid acquisition device 80. In an embodiment, the secondary heat exchanger 160 may operate on a continuous basis. However, the secondary heat exchanger 160 may be selectively operated (e.g., intermittently or periodically) to maintain the tank 12 temperature and pressure within desired temperature and pressure bands. Likewise, the primary heat exchanger 140 may be continuously or intermittently operated. Even further, the primary heat exchanger 140 may be operated in combination with the secondary heat exchanger 160 in order to effectuate control of pressure temperature and pressure within the tank 12.

In this regard, the fluid management system 76 may be operated in any one of a variety of different modes. For example, the primary and/or secondary heat exchangers 140, 160 (FIG. 6) may be operated passively or in conjunction with the spray injection system 114 to reduce thermal stratification and control temperature and pressure within the tank 12. In an embodiment, the primary and/or secondary heat exchangers 140, 160 may be operated by controlling the primary and/or secondary vent valves 152, 172 (FIG. 11) in conjunction with selective activation of the mixer pump 100 to effectuate different levels of cooling of the tank 12. The passive thermodynamic venting provided by the primary and/or secondary heat exchanger 140, 160 provides a backup means of pressure control when the mixer pump 100 is non-operational.

Figure 12:
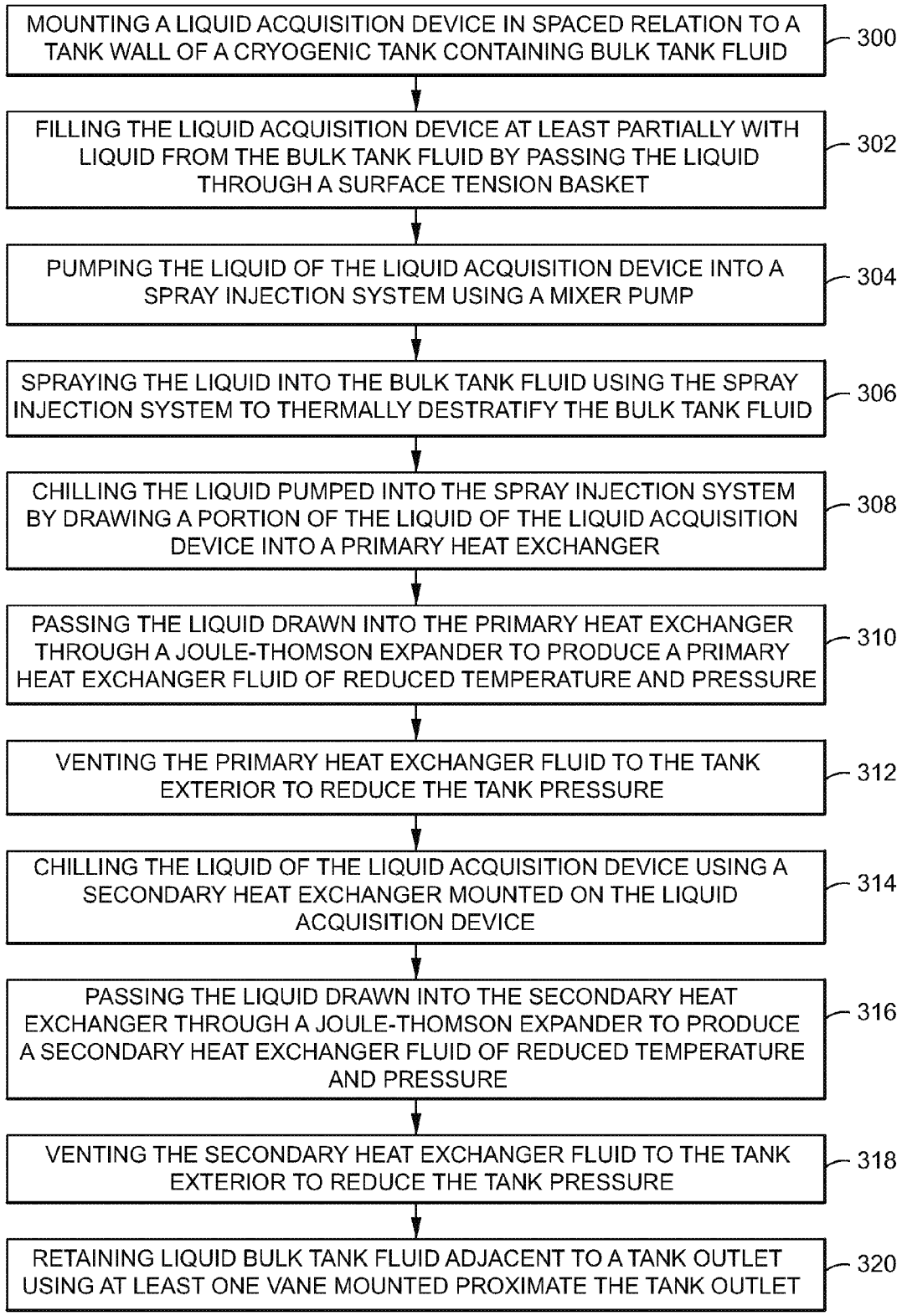
FIG. 12 is an illustration of one or more operations of a methodology for controlling tank pressure within the cryogenic tank.

Referring now to FIGS. 11-12, a methodology for controlling the pressure of a cryogenic tank 12 will be described. In FIG. 12, step 300 of the methodology may comprise mounting the liquid acquisition device 80 in spaced relation to the tank wall 14 of the cryogenic tank 12 as shown in FIGS. 2-4. The liquid acquisition device 80 may comprise a surface tension basket 84 employing one or more screens or meshes for allowing the entry of liquid 52 from the bulk tank fluid 48 into the liquid acquisition device 80 and preventing or limiting the entry of gas 54 into the liquid acquisition device 80.

Advantageously, the spacing s (FIG. 4) of the liquid acquisition device 80 away from the tank wall 14 reduces or eliminates heat entrapment which may otherwise occur for an arrangement wherein the liquid acquisition device housing 82 is in direct contact with the tank 12. Furthermore, by spacing the liquid acquisition device 80 away from the tank wall 14, the bulk tank fluid 48 may flow in an unobstructed manner toward the tank outlet 60. As shown schematically in FIG. 11, the liquid acquisition device 80 may contain a volume of liquid 52 located in spaced arrangement to the tank wall 14.

Step 302 of the methodology illustrated in FIG. 12 may comprise filling the liquid acquisition device 80 at least partially with liquid 52 from the bulk tank fluid 48 by passing the liquid 52 through the surface tension basket 84 in a manner as shown in FIG. 5 and as described above. As illustrated in FIG. 10, during the initial stages of a mission, the liquid 52 from the bulk tank fluid 48 may substantially fill the tank 12. For example, prior to launch, the bulk tank fluid 48 may be in substantially liquid 52 phase and may generally surround the liquid acquisition device 80 such that the liquid acquisition device 80 may remain in a filled state with an absence of gas 54. Although the liquid acquisition device 80 ideally draws in only liquid 52 from the bulk tank fluid 48, it is contemplated that the liquid acquisition device 80 may include a gaseous portion. In this regard, the liquid acquisition device 80 is not to be construed as being limited to a device containing only liquid 52.

Referring still to FIG. 12, heating of the tank exterior 44 (FIG. 1) and/or heating of the bulk tank fluid 48 (FIG. 1) may occur as a result of radiation, convection and/or conduction heating such as from plumbing extending through the sump penetrations 40 illustrated in FIGS. 2-4. The heating of the tank 12 (FIG. 11) and/or bulk tank fluid 48 may cause the tank 12 to self-pressurize. During initial tank self-pressurization, the primary and/or secondary vents 156, 176 (FIG. 11) may be closed to prevent venting of the tank 12 to the tank exterior 44.

Upon reaching an upper limit of a predetermined pressure band and/or to reduce thermal stratification of the bulk tank fluid 48 or minimize localized hot spots within the ullage 56, the mixer pump 100 (FIG. 11) may be activated to provide a controlled flow of liquid 52 from the liquid acquisition device 80 to the spray injection system 114. The liquid 52 may be contained within an inner screen 92 in the embodiment illustrated in FIG. 9. As was earlier indicated, the inner screen 92 may provide a reliable supply of liquid 52 to the mixer pump 100 during startup of the mixer pump 100.

Step 304 of FIG. 12 may comprise pumping the liquid 52 of the liquid acquisition device 80 into the spray injection system 114 using the mixer pump 100 as shown in FIG. 11. The mixer pump 100 discharges a pump outflow 112 from the pump outlet 108 which is received by the spray injection system 114, illustrated in FIG. 6 as a spray bar assembly 116 comprising a plurality of spray tubes 124 fluidly coupled to the main spray bar conduit 118 to a manifold 120. As shown in FIG. 11, the pump outflow 112 flows along the main spray bar conduit 118 toward the manifold 120 for distribution to the spray tubes 124. As was earlier indicated, each one of the spray tubes 124 preferably includes a plurality of orifices 126 for spraying or injecting liquid 52 in a radially outward direction into the ullage 56.

Step 306 of FIG. 12 comprises spraying the liquid 52 into the bulk tank fluid 48 using the spray injection system 114 to thermally destratify the bulk tank fluid 48 and/or ullage 56. As shown in FIG. 10, the spraying of the liquid 52 into the bulk tank fluid 48 may result in thermal destratification of the ullage 56 which may comprise a combination of liquid 52 and gas 54 of the bulk tank fluid 48 in a low-gravity environment. The spraying of the liquid 52 into the bulk tank fluid 48 results in a forced convection transfer of heat between the spray jets 128 of liquid 52 exiting the spray tubes 124 and the ullage 56 resulting in thermal destratification and pressure decay within the tank 12. The mixer pump 100 shown in FIG. 11 may be continuously and/or intermittently operated such as on an as-needed basis to maintain the temperature and pressure of the bulk tank fluid 48 within the desired limits. In this regard, the duty cycle of the mixer pump 100 may be adjusted based upon continuous monitoring of pressure, temperature, mass, quantity and location of the bulk tank fluid 48 within the tank 12.

Step 308 of FIG. 12 may comprise chilling the liquid 52 that is pumped into the spray injection system 114 by the mixer pump 100 as shown in FIG. 11 by drawing a portion of the liquid 52 of the liquid acquisition device 80 into the primary heat exchanger 140. For example, FIG. 11 illustrates liquid 52 from the liquid acquisition device 80 flowing into the primary heat exchanger inlet 142. The primary heat exchanger inlet 142 may include a Joule-Thomson expander 146 to produce a primary heat exchanger fluid 148 (i.e., a two-phase fluid). The primary heat exchanger fluid 148 may have a reduced temperature and pressure relative to the temperature and pressure of the fluid entering the Joule-Thomson expander 146. The primary heat exchanger 140 may be configured in any one of a variety of arrangements including, but not limited to, the parallel-flow, concentric tube arrangement 184 illustrated in FIGS. 4-5 and/or the spiral tube arrangement 186 illustrated in FIG. 9.

Step 310 of FIG. 12 may comprise passing the liquid 52 into the primary heat exchanger 140 through the Joule-Thomson expander 146 as shown in FIG. 11. The primary heat exchanger fluid 148 is preferably substantially vaporized due to absorption of heat from the liquid 52 flowing through the main spray bar conduit 118. The primary heat exchanger fluid 148 may be vented to the tank exterior 44 in step 312. The venting of the primary heat exchanger fluid 148 to the tank exterior 44 as shown in FIG. 11 may reduce the tank 12 pressure which may be controlled by selective operation of the primary vent valve 152.

Step 314 of FIG. 12 may comprise chilling the liquid 52 of the liquid acquisition device 80 shown in FIG. 11 using a secondary heat exchanger 160 which may be mounted on the liquid acquisition device 80. FIGS. 2-4 illustrate the spirally wound tube of the secondary heat exchanger 160 mounted on the liquid acquisition device housing 82 at a forward end of the liquid acquisition device 80. The secondary heat exchanger inlet 162 (FIG. 11) may be located toward an upper end of the liquid acquisition device 80. As shown in FIG. 11, the secondary heat exchanger 160 may draw liquid 52 from the liquid acquisition device 80 through a Joule-Thomson expander 166 which may be mounted at the secondary heat exchanger inlet 162.

Step 316 of FIG. 12 may comprise passing the liquid 52 that is drawn into the secondary heat exchanger 160 through the Joule-Thomson expander 166 as shown in FIG. 11. Passage of the liquid 52 through the Joule-Thomson expander 166 may produce a secondary heat exchanger fluid 168 (i.e., a two-phase fluid) which may have a reduced temperature and/or pressure to facilitate chilling of the liquid 52 contained within the liquid acquisition device 80. In this manner, the secondary heat exchanger 160 may prevent or reduce the accumulation of heat leak energy such as from plumbing extending into the liquid acquisition device 80. The secondary heat exchanger fluid 168 may be rejected to the tank exterior 44 by means of the secondary vent line 170 illustrated in FIG. 11 and which may terminate at a secondary vent valve 172. An additional Joule-Thomson expander 174 may optionally be included at the secondary vent valve 172 as shown in FIG. 11 to further reduce the temperature and pressure of the secondary heat exchanger fluid 168 prior to release from the secondary vent device 176.

Step 318 of FIG. 12 may comprise venting the secondary heat exchanger fluid 168 to the tank exterior 44 through the secondary vent valve 172 as shown in FIG. 11. In this manner, the temperature and/or pressure of the bulk tank fluid 48 may be regulated by selectively activating the mixer pump 100 (FIG. 11) to control the spraying of liquid 52 into the bulk tank fluid 48. The forced convection heat transfer occurring as a result of the spraying of liquid 52 into the bulk tank fluid 48 may reduce thermal stratification within the ullage 56. Likewise, the selective opening and closing of the primary and secondary vent valves 152, 172 in combination with the control of the mixer pump 100 shown in FIG. 11 may facilitate control of the temperature and pressure of the bulk tank fluid 48.

Step 320 of FIG. 12 may comprise retaining the bulk tank fluid 48 adjacent to the tank outlet 60 by means of a plurality of vanes 132 that may be mounted proximate the tank outlet 60 as best seen in FIGS. 2-4. As was indicated earlier, the vanes 132 may provide multiple functionality including anti-vortex capability and additional heat transfer area for the secondary heat exchanger 160 as shown in FIG. 4. Furthermore, the holes 134 (FIG. 4) in the vanes 132 may reduce momentum in the bulk tank fluid 48 by means of frictional losses as the bulk tank fluid 48 passes through the holes 134 in the vanes 132. The vanes 132 may additionally provide structural support for the liquid acquisition device 80 within the tank 12.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A fluid management system for a cryogenic tank having a tank wall and containing bulk tank fluid and including a tank outlet for discharging liquid phase cryogenic fluid, comprising: a liquid acquisition device for acquiring and containing cryogenic fluid in substantially liquid phase, the liquid acquisition device being configured as a surface tension basket completely enclosed by walls, each one of the walls being mounted in spaced, non-contacting relation to the tank wall such that the liquid phase cryogenic fluid contained within the surface tension basket is thermally isolated from an inner surface of the tank wall, the liquid acquisition device retaining liquid when surrounded by gas during migration of the liquid in the bulk tank fluid away from the tank outlet; the surface tension basket has only a single liquid acquisition outlet for liquid flow out of the surface tension basket; a spray injection system for receiving the liquid from the liquid acquisition device and spraying the liquid into the bulk tank fluid, a bottom of the spray injection system being mounted to and receiving liquid from the single liquid acquisition device outlet.

2. The fluid management system of claim 1 wherein the spray injection system comprises a spray bar assembly.

3. The fluid management system of claim 1 further comprising:
a mixer pump housed within the liquid acquisition device for providing a flow of the liquid to the spray injection system.

4. The fluid management system of claim 1 further comprising a heat exchanger configured as at least one of the following:
a primary heat exchanger for chilling the liquid flowing in the spray injection system; and
a secondary heat exchanger for chilling the liquid contained within the liquid acquisition device.

5. The fluid management system of claim 4 further comprising:
a Joule-Thomson expander for producing a heat exchanger fluid of reduced temperature and pressure.

6. The fluid management system of claim 1 further comprising:
at least one vane mounted proximate the tank outlet.

7. A cryogenic tank having a tank wall and containing bulk tank fluid and including a tank outlet for discharging liquid phase cryogenic fluid, comprising: a liquid acquisition device for acquiring and containing fluid in substantially liquid phase, the liquid acquisition device being configured as a surface tension basket completely enclosed by one of the walls being mounted in spaced, non-contacting relation to the tank wall such that the liquid phase cryogenic fluid contained within the surface tension basket is thermally isolated from an inner surface of the tank wall, the liquid acquisition device retaining liquid when surrounded by gas during migration of the liquid in the bulk tank fluid away from the tank outlet; a secondary heat exchanger mounted to the liquid acquisition device for chilling the liquid contained within the liquid acquisition device; the surface tension basket has only a single liquid acquisition outlet for liquid flow out of the surface tension basket; a spray injection system for receiving the liquid from the liquid acquisition device and spraying the liquid into the bulk tank fluid, the bottom of the spray injection system being mounted to and receiving liquid from the single liquid acquisition device outlet.

8. The tank of claim 7 wherein the spray injection system comprises a spray bar assembly.

9. The tank of claim 7 further comprising:
a mixer pump housed within the liquid acquisition device for providing the liquid to the spray injection system.

10. The tank of claim 7 further comprising:
a primary heat exchanger for chilling the liquid received within the spray injection system.

11. The tank of claim 10 wherein the primary heat exchanger extends along at least a portion of the spray injection system.

12. The tank of claim 10 further comprising:
a Joule-Thomson expander for producing a heat exchanger fluid of reduced temperature and pressure.

13. The tank of claim 7 further comprising:
at least one vane mounted proximate the tank outlet.

14. A method of controlling pressure within a cryogenic tank containing bulk tank fluid and including a tank outlet for discharging liquid phase cryogenic fluid, the method comprising the steps of: providing a liquid acquisition device being configured as a surface tension basket completely enclosed by walls, each one of the walls being mounted in spaced, non-contacting relation to the tank wall; filling the liquid acquisition device at least partially with liquid from the bulk tank fluid such that the liquid phase cryogenic fluid contained within the surface tension basket is thermally isolated from an inner surface of the tank wall; retaining liquid within the liquid acquisition device when the liquid acquisition device is surrounded by gas during migration of the liquid in the bulk tank fluid away from the tank outlet; providing a flow of liquid from a single liquid acquisition outlet to a bottom of a spray injection system, the bottom of the spray injection system being mounted to the single liquid acquisition device outlet, the single liquid acquisition outlet being the only outlet for liquid flow out of the surface tension basket; and spraying the liquid into the bulk tank fluid for thermal destratification thereof.

15. The method of claim 14 further comprising the step of:
chilling the liquid flowing from the liquid acquisition device into the spray injection system using a primary heat exchanger prior to spraying the liquid into the bulk tank fluid.

16. The method of claim 15 further comprising the step of:
venting a primary heat exchanger fluid to a tank exterior.

17. The method of claim 14 further comprising the step of:
chilling the liquid contained within the liquid acquisition device using a secondary heat exchanger mounted on the liquid acquisition device.

18. The method of claim 17 further comprising the step of:
venting a secondary heat exchanger fluid to a tank exterior.

19. The method of claim 14 further comprising the step of:
retaining bulk tank fluid adjacent to the tank outlet using at least one vane.

* * * * *